United States Patent [19]

Sato

[11] Patent Number: 4,499,213

[45] Date of Patent: Feb. 12, 1985

[54] COAGULATION

[75] Inventor: Kyosaku Sato, Sarnia, Canada

[73] Assignee: Polysar Limited, Sarnia, Canada

[21] Appl. No.: 531,507

[22] Filed: Sep. 12, 1983

[30] Foreign Application Priority Data

Oct. 18, 1982 [CA] Canada .................................. 413647

[51] Int. Cl.$^3$ .......................... C08F 6/00; C08G 0/00; C08J 3/00
[52] U.S. Cl. .................................... 523/335; 528/486; 528/487; 528/489
[58] Field of Search ...................... 528/486, 487, 489; 523/335

[56] References Cited

U.S. PATENT DOCUMENTS

| | | | |
|---|---|---|---|
| 2,576,909 | 12/1951 | Adams | 528/487 X |
| 2,698,318 | 12/1954 | Brown | 260/80.7 |
| 2,857,351 | 10/1958 | Carroll | 523/335 X |
| 2,870,107 | 1/1959 | Reynolds et al. | 528/487 X |

OTHER PUBLICATIONS

The Condensed Chemical Dictionary, Hawley, 1971, p. 825.
Compounding Ingredients for Rubber, Rubber World, 1961, p. 86.

Primary Examiner—Joseph L. Schofer
Assistant Examiner—S. Babajko
Attorney, Agent, or Firm—Stevens, Davis, Miller & Mosher

[57] ABSTRACT

An improved process is provided for the coagulation from the latex of a carboxylated styrenebutadiene polymer, the improvement being adjusting the pH of the latex to between about 6.5 and about 7.5 and adding an emulsifier mixture which contains, based on 100 parts by weight of polymer in the latex, from about 3 to about 6 parts by weight of the alkali metal salt of a fatty acid and from about 1.5 to about 3.5 parts by weight of the alkali metal salt of a rosin acid.

11 Claims, No Drawings

COAGULATION

BACKGROUND OF THE INVENTION

The present invention is directed to an improved process for the coagulation of a latex of a carboxylated styrene-butadiene polymer wherein an emulsifier mixture is added to improve the coagulation.

DESCRIPTION OF THE PRIOR ART

Carboxylated styrene-butadiene polymers are well known in the art and may be made by the free radical polymerization in aqueous emulsion of a monomer mixture of styrene, butadiene and one or more ethylenically unsaturated carboxylic acid. Suitable such ethylenically unsaturated carboxylic acids include acrylic acid, methacrylic acid, crotonic acid, and maleic acid.

The recovery as solid polymer of carboxylated styrene-butadiene polymer from the latex is a difficult operation. The polymer tends to agglomerate extensively during the coagulation process and tends to form lumps around the agitator, rather than forming small uniformly distributed particles, and is thereby difficult to handle and recover.

SUMMARY OF THE INVENTION

The present invention is directed to a process which essentially eliminates the prior art coagulation problems and results in the formation of small particles which can readily be handled and recovered.

According to the present invention, there is provided an improved process for the coagulation from the latex of a carboxylated styrene-butadiene polymer wherein the latex is added to an agitated aqueous coagulation mixture of sodium chloride and sulphuric acid maintained at a pH of from about 2 to about 4.5 and at a temperature of from about 50° to about 80° C., the improvement being the latex is adjusted to a pH value of from about 6.5 to about 7.5 by the addition of an aqueous solution of an alkali metal hydroxide and an aqueous amulsifier mixture is added to the latex prior to coagulation or simultaneously fed with the latex to the coagulation mixture, the emulsifier mixture being the alkali metal salts of and containing from about 3 to about 6 parts by weight per 100 parts by weight of polymer in the latex of one or more $C_{12}$ to $C_{18}$ fatty acids and from about 1.5 to about 3.5 parts by weight of rosin acid per 100 parts by weight of polymer in the latex, the pH of the emulsifier mixture being adjusted to a value of from about 10 to about 12 by the addition of an aqueous solution of an alkali metal hydroxide.

DETAILED DESCRIPTION OF THE INVENTION

It is most unexpected that the coagulation of the polymer should be so improved by the addition of the emulsifier mixture. It is generally accepted in the art that the amount of emulsifier in a latex should be kept to a minimum for the coagulation procedure. Whereas the prior art coagulation processes lead to extensive agglomeration and formation of large masses of incompletely coagulated polymer, the process of the present invention leads to the formation of discrete small particles of polymer which can readily be handled and recovered.

The carboxylated styrene-butadiene polymers used in the present invention are prepared by the well known free radical polymerization in an aqueous emulsion of the monomers. For preferred such polymers, the styrene content is from about 15 to about 40 weight percent of the polymer, the butadiene content is from about 50 to about 84 weight percent of the polymer and the ethylenically unsaturated carboxylic acid content is from about 1 to about 10 weight percent. Suitable ethylenically unsaturated carboxylic acids include acrylic, methacrylic, crotonic, maleic and itaconic acids. The coagulation mixture is an aqueous mixture of sodium chloride and sulphuric acid, in which the amount of sulphuric acid is sufficient to maintain the pH at from about 2 to about 4.5 and the amount of sodium chloride is from about 5 to about 12 percent by weight. Preferably the amount of sulphuric acid is sufficient to maintain the pH at from about 3.5 to about 4.5 The coagulation mixture is maintained at a temperature of from about 50° to about 80° C. The coagulation mixture is maintained under agitation for the coagulation process.

The pH of the carboxylated styrene-butadiene latex is adjusted to a value of from about 6.5 to about 7.5, preferably from about 6.8 to about 7.2, by the addition of an aqueous solution of an alkali metal hydroxide such as sodium hydroxide or potassium hydroxide.

The emulsifier mixture is prepared by adding to water the fatty acid and the rosin acid, or the alkali metal salts thereof, adding sufficient aqueous solution of an alkali metal hyroxide, such as sodium hydroxide or potassium hydroxide, to adjust the pH to a value of from about 10 to about 12, preferably from about 10.5 to about 11.5, and mixing to allow the materials to dissolve in the water thereby providing a solution of the alkali metal salts. The amount of fatty acid used is sufficient to provide, on addition to the system, from about 3 to about 6, preferably from about 4 to about 5.5, parts by weight per 100 parts by weight of polymer in the latex. The amount of rosin acid used is sufficient to provide, on addition to the system, from about 1.5 to about 3.5, preferably from about 2 to about 3, parts by weight per 100 parts by weight of polymer in the latex. The fatty acids are well known and include one or more of the $C_{12}$ to $C_{18}$ fatty acids, such as lauric, myristic, palmitic and stearic acids, the preferred materials usually being mixtures of predominantly stearic and palmitic acids. The rosin acids are well known and are sometimes referred to as disproportionated rosins or hydrogenated rosin acid and are usually mixtures containing a major proportion of dehydroabietic acid and minor proportions of dihydroabietic acid and tetrahydroabietic acid.

In the operation of the present process, the emulsifier mixture may be added to the latex prior to coagulation and thereby mixed directly with the pH adjusted latex and the mixture then added to the coagulation mixture or the pH adjusted latex and the emulsifier mixture may be simultaneously fed as separate streams to the coagulation mixture.

The coagulated polymer so formed is separated from the aqueous phase, such as by passage over a screening device, may then be washed and is dried, such as by passage through a hot air drier or an extrusion drier, and packaged ready for sale.

Uses of carboxylated styrene-butadiene polymer are well known and include the manufacture of various mechanical goods. Comparison of carboxylated styrene-butadiene polymers obtained by the process of the present invention with like polymers obtained, with great difficulty, by prior art coagulation processes shows that vulcanizates of the polymers obtained by the present invention possess improved physical properties and especially have improved trouser tear strength and flex resistance.

The following examples serve to illustrate the present invention without limiting the scope thereof.

EXAMPLE 1

A latex of a carboxylated styrene-butadiene polymer was coagulated in a 4.5 l coagulation vessel. The latex contained about 15 weight percent of polymer and the polymer contained about 21 weight percent of styrene and about 4.5 weight percent of methacrylic acid, the balance being butadiene. An aqueous emulsifier mixture was prepared by mixing fatty acid (predominantly a mixture of stearic and palmitic acids) and rosin acid (hydrogenated rosin acid) in water, and adjusting the pH to 11 by the addition of aqueous sodium hydroxide, thereby forming the sodium salts of the acids. The pH of the latex was adjusted to 7 by the addition of aqueous sodium hydroxide, following which the emulsifier mixture was added to and mixed with the latex. To the coagulation vessel was added about 2 l of an aqueous coagulation mixture which was a mixture containing about 10 weight percent of sodium chloride and sufficient sulphuric acid to provide a pH of 4. The coagulation mixture was heated to about 70° C., an agitator in the coagulation vessel was started and the latex-emulsifier mixture was slowly added together with sufficient additional coagulation mixture to maintain the pH at 4. The coagulated polymer was separated from the aqueous phase, washed with water and dried in a hot air drier. Table 1 shows the composition of the emulsifier mixtures used, with Experiment No. 1 being a control to which no emulsifier mixture was added. For Experiment No. 1, the polymer tended to accumulate as lumps around the agitator and was recovered and washed with great difficulty and the serum, on completion of the coagulation, was milky. For Experiments Nos. 2 and 3, a fine particle size crumb was formed and the serum, on completion of the coagulation, was clear. The dried polymers were compounded in the recipe shown in Table 1, vulcanized at 160° C. for the times shown and possessed the properties shown in Table 1. All parts are parts by weight; phr means parts per hundred parts of polymer. PA-50 is a peroxidic curing system which is an approximately 50:50 mixture of zinc peroxide and butadiene-acrylonitrile polymer. Improved trouser tear strength and DeMattia flex are apparent from the results in Table 1 for the polymers coagulated by the process of the present invention.

TABLE 1

| Experiment No. | | 1 | 2 | 3 |
|---|---|---|---|---|
| Emulsifier mixture | | | | |
| fatty acid salt | phr | 0 | 4 | 5 |
| rosin acid salt | phr | 0 | 2 | 2.5 |
| Compound recipe: Polymer 95, carbon black (N-550) 40, stearic acid 1, tetramethylthiuram monosulphide 1.5, sulphur 1, extender oil (Sunthene 422) 10, PA-50 10. | | | | |
| Cure time | minutes | 10 | 9 | 9 |
| Vulcanizate properties | | | | |
| Tensile strength | MPa | 21.1 | 21.8 | 21.0 |
| Elongation | % | 390 | 460 | 480 |
| 100% Modulus | MPa | 3.7 | 3.4 | 3.2 |
| 300% Modulus | MPa | 15.9 | 13.5 | 12.4 |
| Hardness - Shore A | | 76 | 77 | 77 |
| Tensile set | % | 5 | 5 | 5 |
| Tear - Die C | kn/m | 51 | 46 | 50 |
| Tear - Trouser | kn/m | 5.5 | 7.0 | 8.5 |
| DeMattia Flex | | | | |

TABLE 1-continued

| Experiment No. | | 1 | 2 | 3 |
|---|---|---|---|---|
| 300% | k cycles | 0.3 | 0.6 | 4 |
| 600% | k cycles | 0.8 | 1.6 | 70 |
| Abrasion (NBS) | % | 362 | 366 | 297 |

EXAMPLE 2

The latex of Example 1 was coagulated using a similar procedure except that the emulsifier mixture and the pH adjusted latex were separately added to the coagulation mixture. The emulsifier mixture had a pH of 11 and contained sufficient fatty acid salt to provide 4 parts by weight per 100 parts by weight of polymer and sufficient rosin acid salt to provide 3 parts by weight per 100 parts by weight of polymer. A fine particle size crumb was formed and the serum, on completion of the coagulation, was clear. The dried polymer was compounded in the recipe shown in Table 1 and vulcanized for 8.5 minutes at 160° C., the vulcanizate having the properties shown in Table 2.

EXAMPLE 3

A different carboxylated styrene-butadiene latex (about 19 weight percent of styrene and about 5 weight percent of methacrylic acid, the balance being butadiene) was coagulated following the procedure described in Example 1. In a control experiment, 4 parts by weight, per 100 parts by weight of polymer in the latex, of fatty acid salt was added to the pH stabilized latex which, on addition to the coagulation mixture, accumulated as lumps around the agitator and was difficult to recover. In two experiments according to the invention, one sample of latex containing 5 parts by weight of fatty acid salt and 2 parts by weight of rosin acid salt and a second sample of latex containing 5 parts by weight of fatty acid salt and 2.5 parts by weight of rosin acid salt were separately coagulated and formed fine particle size crumbs, the serum being clear for each coagulation. The polymer samples were easy to separate and recover.

TABLE 2

| Experiment No. | | 4 |
|---|---|---|
| Emulsifier mixture | | |
| fatty acid salt | phr | 4 |
| rosin acid salt | phr | 3 |
| Vulcanizate Properties | | |
| Tensile Strength | MPa | 17.5 |
| Elongation | % | 390 |
| 100% Modulus | MPa | 3.4 |
| 300% Modulus | MPa | 12.9 |
| Hardness - Shore A | | 75 |
| Tensile set | % | 5 |
| Tear - Die C | kn/m | 45 |
| Tear - Trouser | kn/m | 7.8 |
| DeMattia Flex | | |
| 300% | k cycles | 0.8 |
| 600% | k cycles | 4.4 |
| Abrasion (NBS) | % | 343 |

What is claimed is:

1. An improved process for the coagulation from the latex of a carboxylated styrene-butadiene polymer wherein the latex is added to an agitated aqueous coagulation mixture of sodium chloride and sulphuric acid maintained at a pH of from about 2 to about 4.5 and at a temperature of from about 50° to about 80° C., the improvement being the latex is adjusted to a pH value of from about 6.5 to about 7.5 by the addition of an aqueous solution of an alkali metal hydroxide and an aqueous emulsifier mixture is added to the latex prior to coagulation or simultaneously fed with the latex to the coagulation mixture, the emulsifier mixture being the alkali metal salts of and containing from about 3 to about 6 parts by weight per 100 parts by weight of polymer in the latex of one or more $C_{12}$ to $C_{18}$ fatty acids and from about 1.5 to about 3.5 parts by weight or rosin acid per 100 parts by weight of polymer in the latex, the pH of the emulsifier mixture being adjusted to a value of from about 10 to about 12 by the addition of an aqueous solution of an alkali metal hydroxide.

2. The process of claim 1 wherein the emulsifier mixture is added to the pH adjusted latex prior to coagulation.

3. The process of claim 1 wherein the emulsifier mixture and the pH adjusted latex are simultaneously fed as separate streams to the coagulation mixture.

4. The process of claim 1 wherein the fatty acid is a mixture of predominantly stearic and palmitic acids and the emulsifier mixture contains from about 4 to about 5.5 parts by weight of fatty acid.

5. The process of claim 1 wherein the emulsifier mixture contains from about 4 to about 5.5 parts by weight of a fatty acid which is a mixture of predominantly stearic and palmitic acids and from about 2 to about 3 parts by weight of rosin acid.

6. The process of claim 1 wherein the latex is adjusted to a pH of from about 6.8 to about 7.2 and the coagulation mixture contains from about 5 to about 12 percent by weight of sodium chloride and the amount of sulphuric acid is sufficient to maintain the pH at from about 3.5 to about 4.5.

7. The process of claim 1 wherein the carboxylated styrene-butadiene polymer contains from about 15 to about 40 weight percent of styrene, from about 50 to about 84 weight percent of butadiene and from about 1 to about 10 weight percent of ethylenically unsaturated carboxylic acid.

8. The process of claim 2 wherein the emulsifier mixture contains from about 4 to about 5.5 parts by weight of a fatty acid which is a mixture of predominantly stearic and palmitic acids and from about 2 to about 3 parts by weight of rosin acid.

9. The process of claim 3 wherein the emulsifier mixture contains from about 4 to about 5.5 parts by weight of a fatty acid which is a mixture of predominantly stearic and palmitic acids and from about 2 to about 3 parts by weight of rosin acid.

10. The process of claim 8 wherein the latex is adjusted to a pH of from about 6.8 to about 7.2 and the coagulation mixture contains from about 5 to about 12 percent by weight of sodium chloride and the amount of sulphuric acid is sufficient to maintain the pH at from about 3.5 to about 4.5.

11. The process of claim 9 wherein the latex is adjusted to a pH of from about 6.8 to about 7.2 and the coagulation mixture contains from about 5 to about 12 percent by weight of sodium chloride and the amount of sulphuric acid is sufficient to maintain the pH at from about 3.5 to about 4.5.

* * * * *